(12) United States Patent
Krucinski et al.

(10) Patent No.: US 10,651,590 B1
(45) Date of Patent: May 12, 2020

(54) SELF-CLEANING ELECTRICAL CONNECTOR HAVING PINS WITH INSULATED ENDS

(71) Applicant: ABB Schweiz AG, Baden (CH)

(72) Inventors: Martin Krucinski, Gastonbury, CT (US); Stefan J. Raaijmakers, Delft (NL); William J. Eakins, Coventry, CT (US); Gregory A. Cole, West Hartford, CT (US); Sangeun Choi, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/182,059

(22) Filed: Nov. 6, 2018

(51) Int. Cl.
*H01R 4/60* (2006.01)
*H01R 13/52* (2006.01)
*H01R 13/10* (2006.01)
*H01R 13/04* (2006.01)

(52) U.S. Cl.
CPC ............ *H01R 13/52* (2013.01); *H01R 13/04* (2013.01); *H01R 13/10* (2013.01)

(58) Field of Classification Search
CPC .................................................. H01R 13/5277
USPC .................................................. 439/205, 693
See application file for complete search history.

(56) References Cited

U.S. PATENT DOCUMENTS

| | | | | |
|---|---|---|---|---|
| 3,271,727 A | * | 9/1966 | Nelson | H01R 13/523 439/281 |
| 3,397,378 A | * | 8/1968 | Dietrich | H01R 13/523 439/205 |
| 3,757,274 A | * | 9/1973 | Hazelhurst | H01R 13/523 439/281 |
| 4,299,431 A | * | 11/1981 | Wilson | H01R 13/523 439/205 |
| 6,319,031 B1 | * | 11/2001 | Greenstein | A61N 1/3752 439/205 |
| 2018/0001777 A1 | | 1/2018 | Kilic | |

FOREIGN PATENT DOCUMENTS

| | | |
|---|---|---|
| DE | 102016008982 A1 | 2/2017 |
| DE | 102017007818 A1 | 1/2018 |

* cited by examiner

*Primary Examiner* — Phuong K Dinh
(74) *Attorney, Agent, or Firm* — Leydig, Voit & Mayer, Ltd.

(57) ABSTRACT

A conductor arrangement includes a first connector having a first connector body made from an electrically insulated material and including a first electrical conductor. A pin extends from the first connector body and includes a core made from an electrically conductive material. The core is electrically connected with the first electrical conductor. A second connector has a second connector body made from an electrically insulated material and includes a second electrical conductor. A socket extends through the second connector body between two opposed openings. A sleeve made from an electrically conductive material is disposed along the socket and is electrically connected with the second electrical conductor. An electrical connection between the first and second electrical conductors is established when the pin is fully disposed within the socket such that the core is electrically connected with the sleeve.

20 Claims, 8 Drawing Sheets

28

```
┌─────────────────────────────────┐
│      POSITION CHARGE            │
│      CONNECTOR PLUG             │
│    WITH REFERENCE TO MATING     │
│  CHARGE CONNECTOR RECEPTACLE    │
│              30                 │
└─────────────────────────────────┘
              │
              ▼
┌─────────────────────────────────┐
│    INSERT CHARGE CONNECTOR      │
│       PLUG INTO CHARGE          │
│     CONNECTOR RECEPTACLE        │
│              32                 │
└─────────────────────────────────┘
              │
              ▼
┌─────────────────────────────────┐
│    CHARGE EV BY TRANSFERRING    │
│  POWER THROUGH MATED CONNECTORS │
│              33                 │
└─────────────────────────────────┘
```

FIG. 2

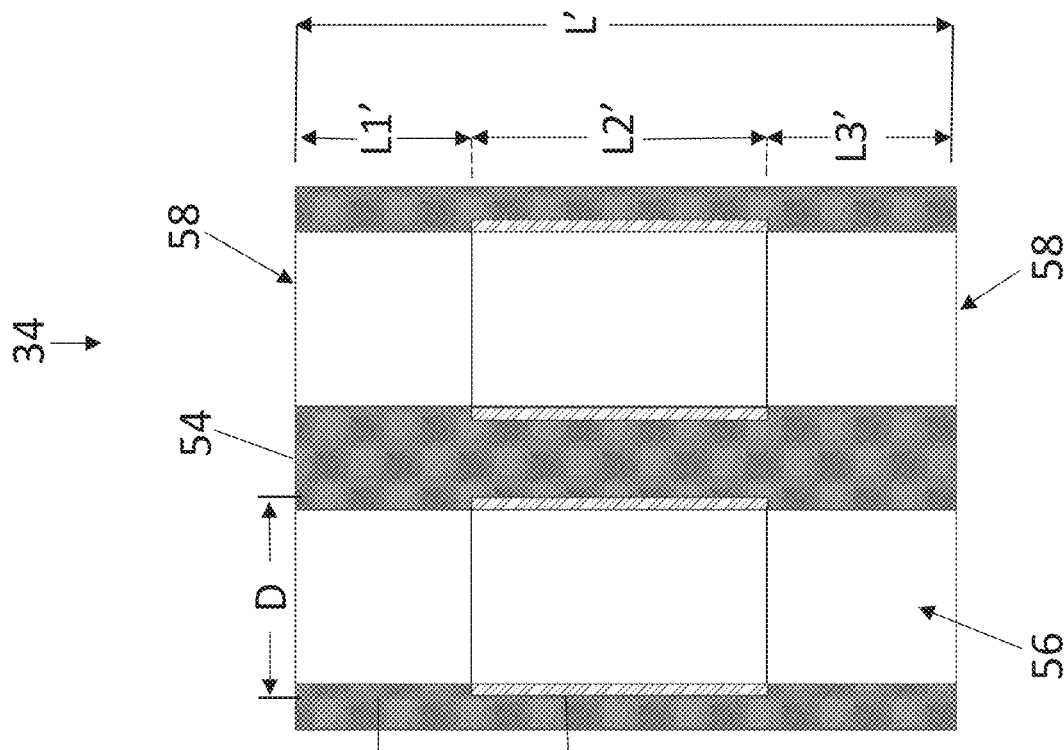
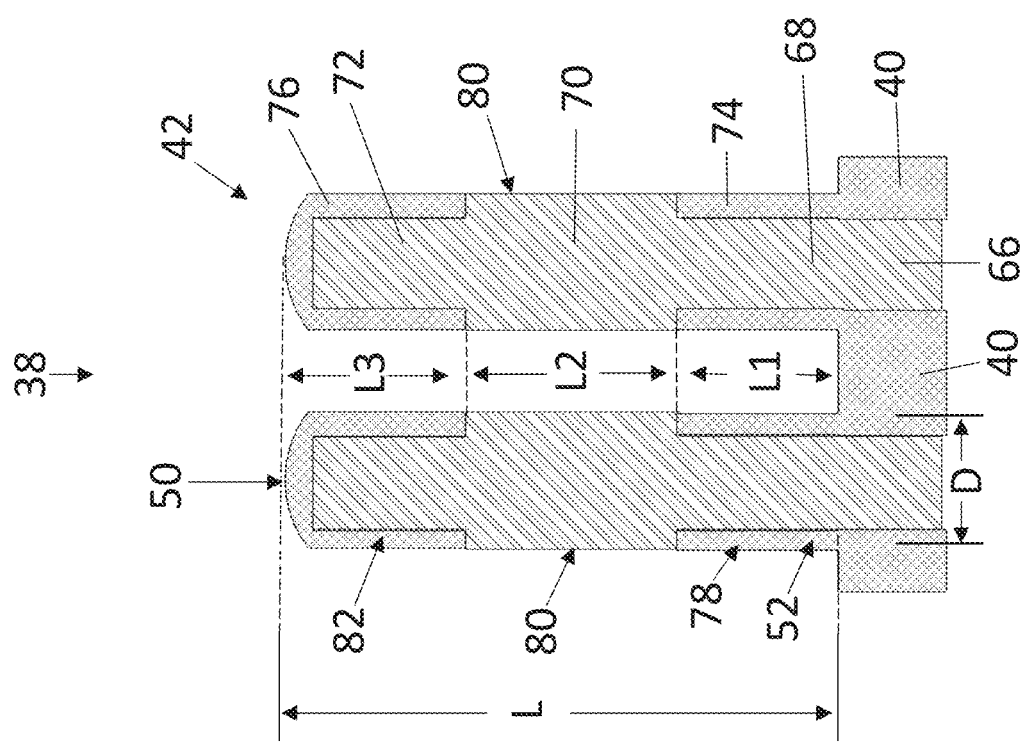

SELF-CLEANING ELECTRICAL CONNECTOR HAVING PINS WITH INSULATED ENDS

TECHNICAL FIELD

The present disclosure relates to charging systems and methods for electric vehicles and, more particularly, to a connector for effecting an electrical connection between a vehicle charger and the vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volt AC, and transfer about 30 Amp of electrical power into a vehicle. As a consequence, providing a full charge to a vehicle can take up to 10 hours or more. With the increase in popularity of electric vehicles, faster charging solutions are required, especially for vehicles that operate for more than 12 hours per day such as emergency vehicles, public transportation, professional vehicles and the like.

SUMMARY OF THE DISCLOSURE

In one aspect, the disclosure describes a conductor arrangement for conducting power when charging an electric vehicle. The conductor arrangement includes a first connector having a first connector body made from an electrically insulated material and including a first electrical conductor. A pin extends from the first connector body and includes a core made from an electrically conductive material. The core is electrically connected with the first electrical conductor. A second connector has a second connector body made from an electrically insulated material and includes a second electrical conductor. A socket extends through the second connector body between two opposed openings. A sleeve made from an electrically conductive material is disposed along the socket and is electrically connected with the second electrical conductor. An electrical connection between the first and second electrical conductors is established when the pin is fully disposed within the socket such that the core is electrically connected with the sleeve.

In another aspect, the disclosure describes a compact connector arrangement. The arrangement includes a first connector having a first connector body made from an electrically insulated material and including a first plurality of electrical conductors, and a plurality of pins extending from the first connector body, each of the plurality of pins including a core made from an electrically conductive material, the core being electrically connected with one of the first plurality of electrical conductors. A second connector has a second connector body made from an electrically insulated material and includes a second plurality of electrical conductors, and a plurality of sockets extending through the second connector body between two corresponding opposed openings. A plurality of sleeves made from an electrically conductive material is disposed along the a socket from the plurality of sockets and is electrically connected with one of the second plurality of electrical conductors. An electrical connection between the first and second pluralities of electrical conductors is established when the plurality of pins is fully disposed within the plurality of sockets such that each respective core is electrically connected with each respective sleeve.

In yet another aspect, the disclosure describes a method for providing a self-cleaning electrical connector. The method includes providing a pin extending from a first connector body, and providing a socket formed in a second connector body, the socket being open between two opposed openings in the second connector body to form a through-bore. An insulated tip of the pin is inserted into the socket through the first of the two opposed openings and removes debris from the socket by scraping an inner surface of the socket with the tip while pushing the tip towards the second of the two opposed openings.

Further and alternative aspects and features of the disclosed principles will be appreciated from the following detailed description and the accompanying drawings. As will be appreciated, the principles related to systems, methods, and software for establishing electrical connections as disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 2 is a flowchart of a method for underside charging of EVs according to an embodiment of the disclosure.

FIGS. 5 and 6 are partial views in cross section of a pair of pins from the plug shown in FIG. 3, and a mating pair of sockets from the receptacle shown in FIG. 4, respectively.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The present disclosure relates to electrical connectors for effecting connections that deliver electrical power to fast charge a battery or other power storage device on an electric vehicle. An increase in power delivery to the vehicles using existing connectors, conduits and power dispensers to achieve a faster charge is not well suited and cannot handle a dramatic power increase, which can be in the range of transferring 500 Amp of electrical current at a potential of about 1,600 Volt. Previously proposed solutions for high voltage and high current power transfer to charge electric vehicles are not practical in that a considerable increase to the size and spacing of connector pins on a connector that connects power to charge the vehicle to the vehicle is required to handle the increased voltage and current. This is because a minimum air distance must be maintained between conductors of opposite polarities that carry high electrical potential. Moreover, increased voltage and current delivery through a conduit to a vehicle using a manually operated vehicle electrical connection process, as is currently done, might be cumbersome due to the large size of the connectors that are required, and difficult for a user to accomplish in that the force required to engage connectors between a power dispenser and the vehicle can be larger than some users can manually achieve.

Figure 1:
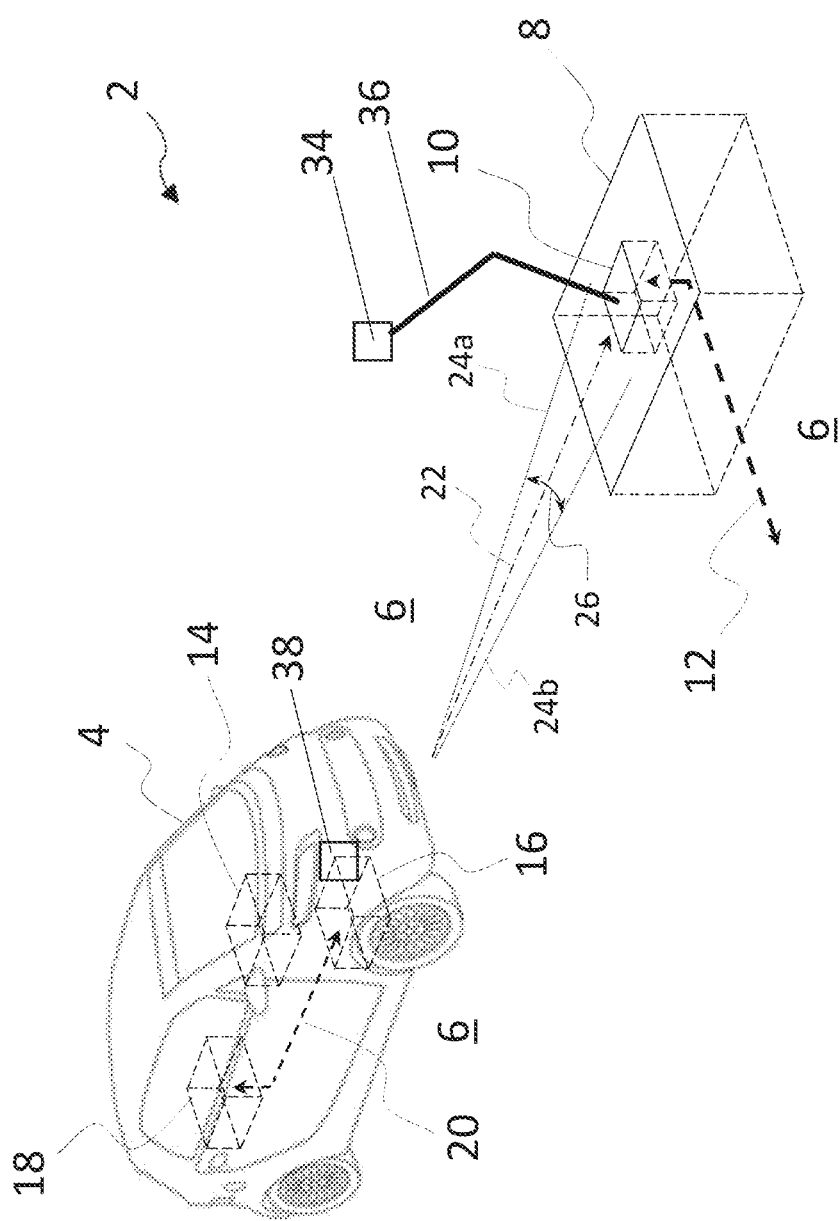
FIG. 1 is a perspective view of an electric vehicle (EV) charging environment according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV 4 may be a truck, a motorcycle, a moped, a truck or bus, a farm implement or any other on- or off-highway vehicle. In the example shown, ground surface 6 is a floor of a garage of a home or business. Alternatively, ground surface 6 may be a surface of a parking lot. Environment 2 includes a floor unit 8. Floor unit 8 is positioned on or, at least in part, beneath ground surface 6. Depending on application, and also on the ground clearance of the vehicle, the floor unit 8 may be fully or partially disposed beneath the ground surface, or may alternatively be disposed on the ground surface, for example, when installed on existing floors. Floor unit 8 includes a connector unit 10. At least a portion of connector unit 10 faces and is exposed or exposable to ground surface 6. Floor unit 8 includes a connector unit 10 that is operatively coupled to or associated with an electric power source (e.g., a utility grid, not shown in FIG. 1), either directly or through a transforming or conditioning device such as a transformer. A first electric power flow 12 can thus be selectively enabled between power source and floor unit 8, including to connector unit 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (now shown) of the EV 4 are omitted for simplicity. At least a portion of vehicle unit 16 faces and is exposed or exposable to ground surface 6. It is noted that, while the EV 4 is shown in one orientation as it approaches the floor unit 8, any orientation of approach is also contemplated. Vehicle unit 16 is operatively coupled to battery 18 to provide an interface for providing electrical power to charge the battery 18. A second electric power flow 20 is thus enabled between vehicle unit 16 and battery 18.

In the EV charging environment 2 shown in FIG. 1, EV 4 is being driven and approaches the floor unit 8 including connector unit 10. A driver of EV 4 (e.g., a human driver and/or an autonomous vehicle driving system, not shown in FIG. 1) steers or otherwise controls the EV 4 to floor unit 8 including connector unit 10 along a centerline path 22. As shown in FIG. 1, centerline path 22 extends from EV 4 to at least approximately a center point of connector unit 10 proximal ground surface 6. Based on the particular dimensions and other specifications of EV 4, floor unit 8 including connector unit 10, and/or vehicle unit 16, an approach path of EV 4 to floor unit 8 including connector unit 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b. An allowable deviation angle 26 is defined between lines defining driver side deviation 24a and passenger side deviation 24b. In three dimensions, the deviation angle 26 may form a conical area that accounts for height of ground clearance of the vehicle, as well pitch, yaw and roll of the vehicle's trajectory during the approach to the floor unit 8, and also during the connection and charging operations.

FIG. 2 is flowchart of a method 28 for underside charging of the EV 4 according to an embodiment of the disclosure. In an example, method 28 is implemented and performed, at least in part, by a mechanical and electrical linkage system 36, which rises up from the floor 6 from the connector unit 10 and includes an electrical connector 34. The electrical connector 34 matingly engages a connector 38 associated with the vehicle unit 16 when the EV 4 is stationary over the floor unit 8 for charging.

Referring to FIG. 2, method 28 includes positioning at 30 the connector 34 on the floor unit 8 with reference to connector 38 on the EV 4 using linkage 36. Such placement may be carried out automatically. Method 28 further includes inserting at 32 the connector 34 into connector 38, and initiating a charging process at 33. When the connectors 34 and 38 are mated, a flow of electrical power from the power flow 12 is allowed to be transmitted from the floor unit 8 to the vehicle unit 16, and from there to the battery 18 to charge the battery. A breakable electrical connection between the connectors 34 and 38 is included in this power flow path that charges the battery 18. As can be appreciated, the environment in which the connectors 34 and 38 is harsh because one or both sides of the connectors 34 and 38 are exposed to the environment, road debris, etc. Moreover, the connectors 34 and 38 are advantageously compact to enable or facilitate manual and/or automatic coupling for charging the battery 18.

Figure 3:
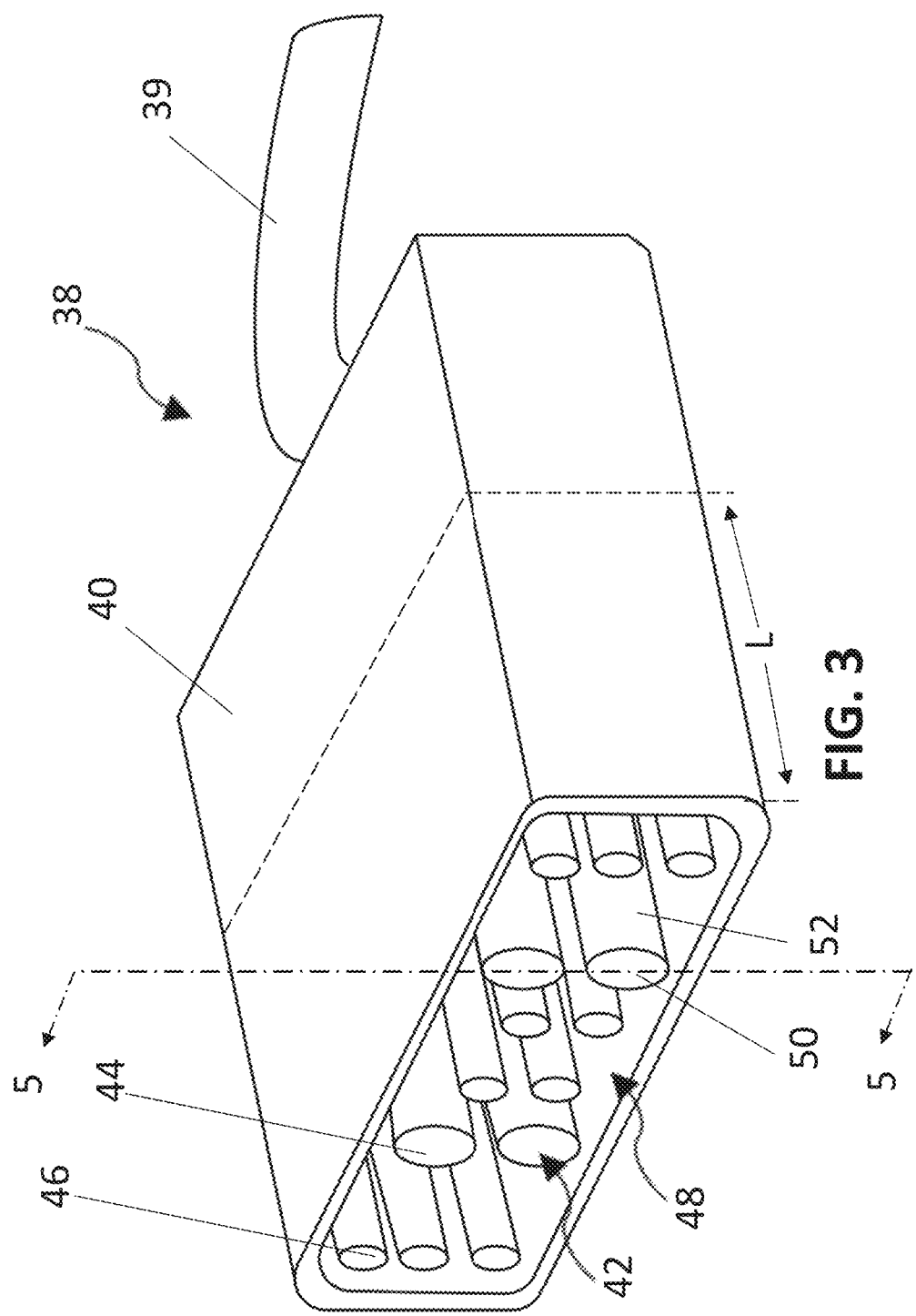
FIG. 3 is an outline view of a plug having electrical pins in accordance with the disclosure.
Figure 4:
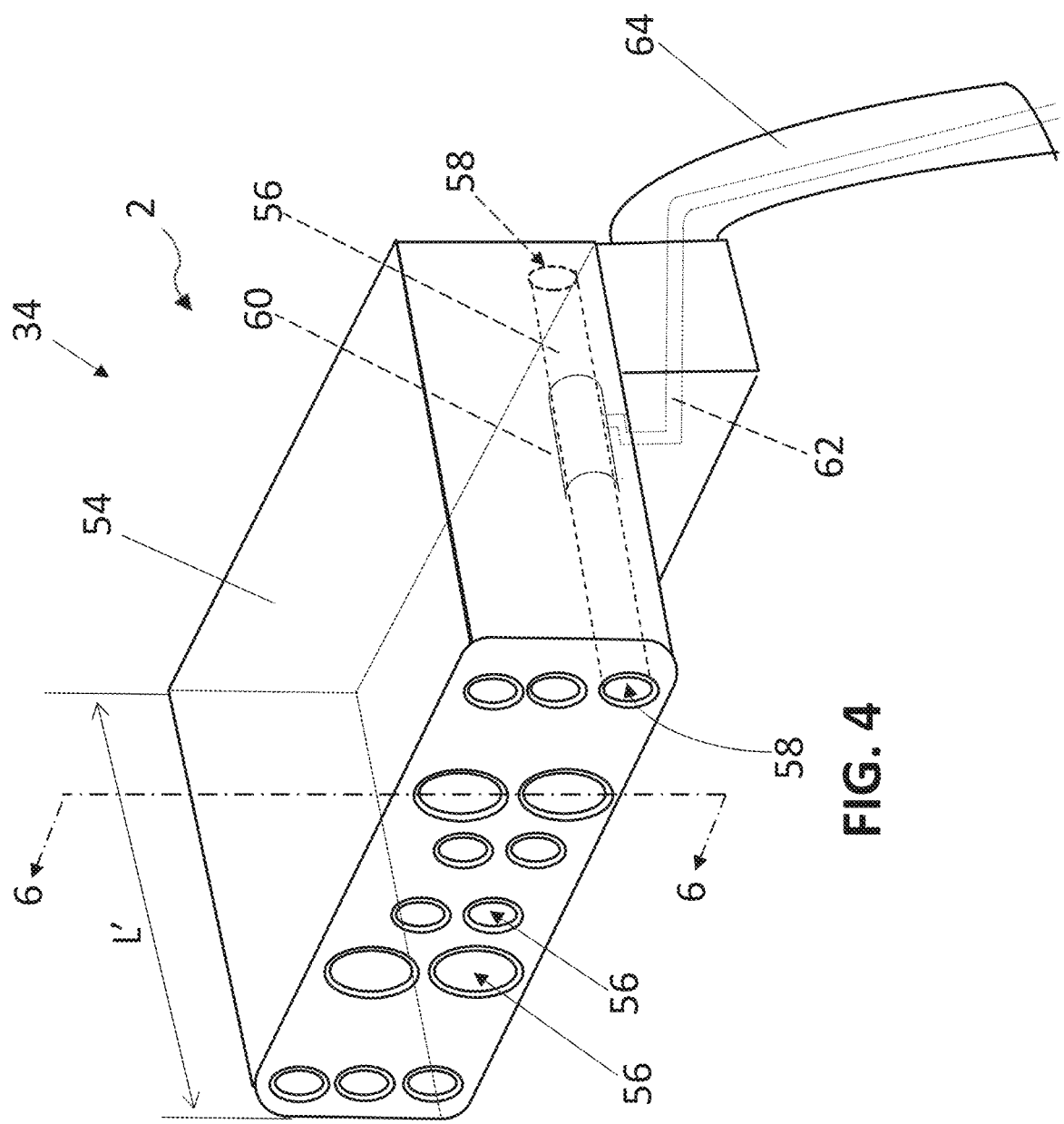
FIG. 4 is an outline view of a receptacle having sockets for receiving the electrical pins of the plug shown in FIG. 3.
Figure 8:
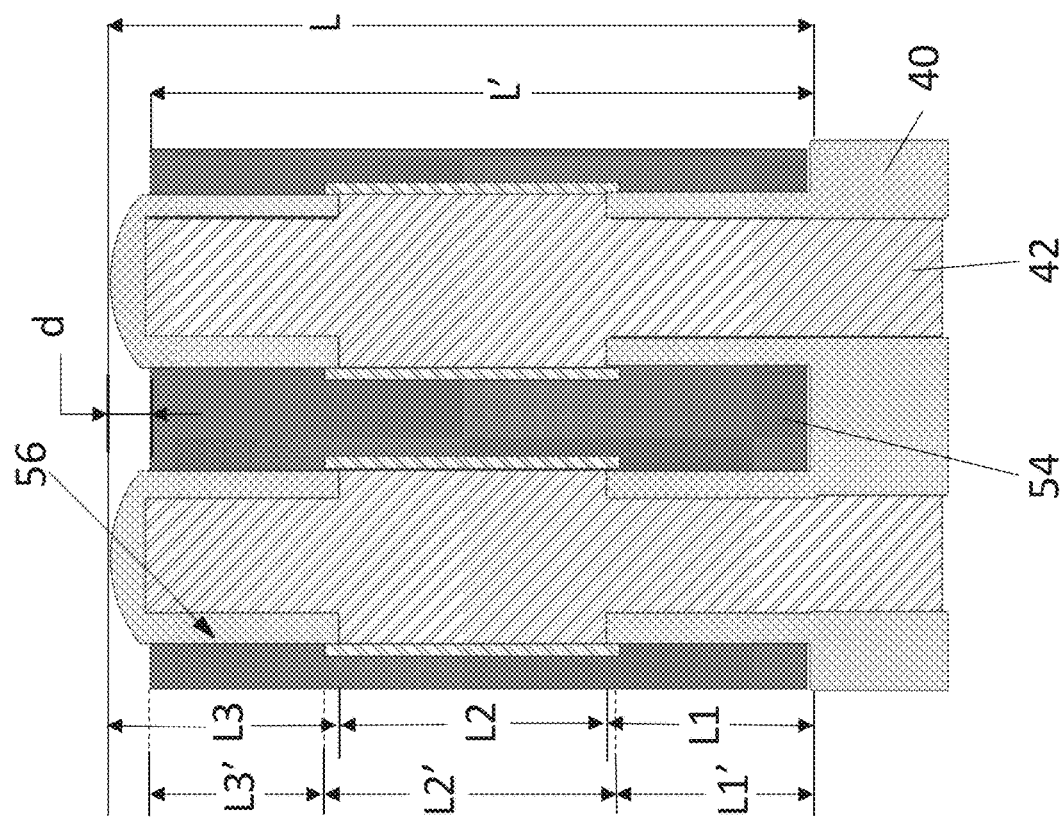
FIGS. 7 and 8 are partial cross section views of partially and fully inserted pair of pins from the plug shown in FIG. 3 into their sockets in the receptacle shown in FIG. 4, respectively.
Figure 7:
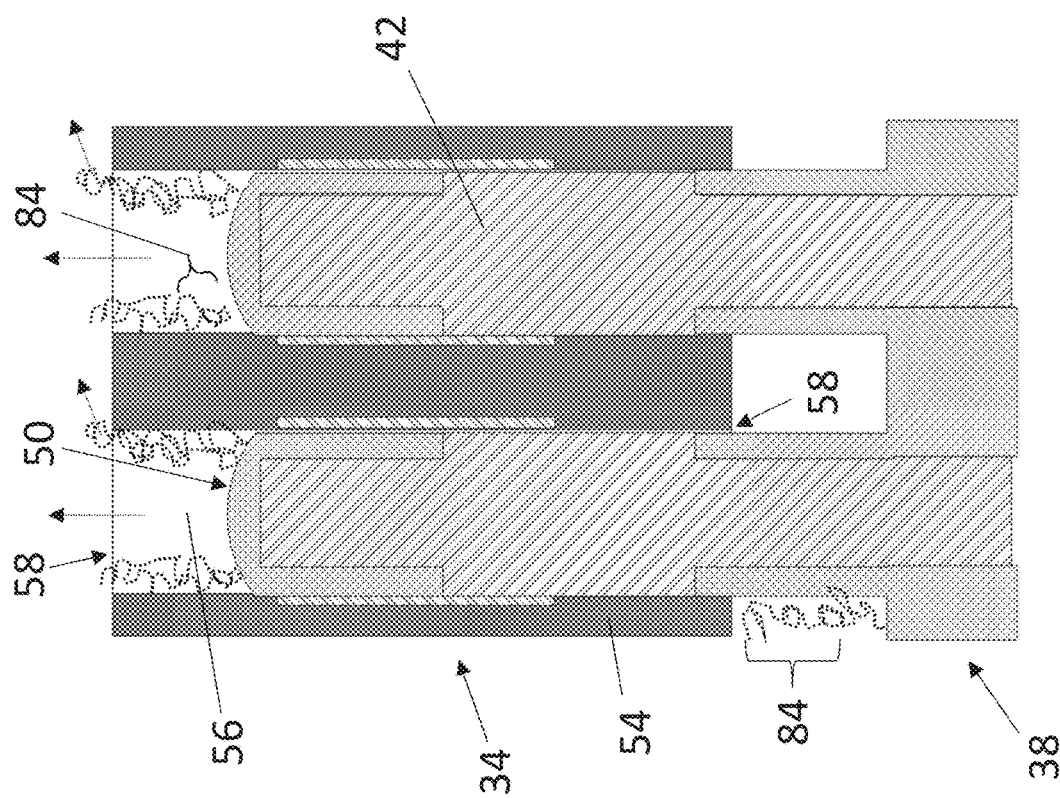

One embodiment for electrical coupling elements between the connectors 34 and 38 are shown in FIGS. 3-8 and described below. FIG. 3 is an outline view of a plug having electrical pins in accordance with the disclosure, which can be embodied as the vehicle-side connector 38, and FIG. 4 is an outline view of a receptacle having sockets for receiving the electrical pins of the plug shown in FIG. 3, which can be included as the electrical connector 34 associated with the floor unit 8. FIGS. 5 and 6 are partial views in cross section of a pair of pins from the plug shown in FIG. 3, and a mating pair of sockets from the receptacle shown in FIG. 4, respectively. FIGS. 7 and 8 are partial cross section views of partially and fully inserted pair of pins from the plug shown in FIG. 3 into their sockets in the receptacle shown in FIG. 4, respectively.

In reference to these figures, the exemplary embodiment for the connector 38 (FIG. 3) includes a connector body 40, from which a plurality of pins 42 extend over a length, L. The plurality of pins 42 may include pins of different diameters, for example, larger pins 44 that carry electrical power to charge the vehicle, or smaller pins 46, which carry digital or analog signals containing information exchanged between controllers associated with the EV 4 and the floor unit 8. An electrical conduit 39 contains electrical and/or information conduits that are associated with the pins 42. In the embodiment shown, the plurality of pins 42 is disposed within a cavity 48 of the connector body 40, but may alternatively be entirely or partially exposed along their length, L. Each of the plurality of pins 42 includes a tip 50 and a lateral surface 52. Each of the plurality of pins 42 is shown as having a generally cylindrical shape such that the lateral surface 52 is also cylindrical, but it should be appreciated than other appropriate shapes are also contemplated and within the scope of the disclosure, including pins having rectangular, square, triangular, polygonal or any other desired cross sectional shape.

Importantly, it can be seen that the pins are relatively in close proximity to one another. This can be accomplished because the tips 50, and a portion of the lateral surfaces 52 of the pins are covered with an electrically insulated material. This feature enables the relative crowding of the pins 42, and enables use of a compact connector, which can be useful when establishing a mated electrical connection between the connector 38 and the mating connector 34, which is shown in outline view in FIG. 4, using automated systems.

In reference to FIG. 4, the exemplary embodiment for the connector 34 includes a connector body 54 into which a plurality of sockets 56 extend over the length, L. Each of the sockets 56 extends entirely through the body 54 between openings 58 formed on both axial ends of each socket 56. This enables bi-directional connection of the connector 38 from either axial end of the connector body 54, which allows interface with the EV 4 approaching from either the forward or rearward travel direction. In the embodiment shown, each socket includes a sleeve 60 formed internally thereto, as will be described below, which electrically communicates with a conduit 62 extending through an interface 64.

To illustrate various internal components, reference will now be made to the cross section views shown in FIGS. 5 and 6. In reference to FIG. 5, two adjacent pins 42 are shown in cross section. Each pin 42 includes a metal or electrically conductive core 66 that is embedded within the material of the body 40. The body 40, at least in areas adjacent the pins 42, is made from an electrically insulated material, which also extends at least partially around portions of the pins 42, although a different insulated material than the material used to construct or mold the body can also be used. Each core 66 includes a root portion 68 that extends from the body 40, a conductive portion 70, and a tip portion 72. As can be seen, the electrically conductive portion is barrel or cylindrical shaped and extends peripherally around the pin.

The root portion 68 is surrounded by an root jacket 74, which is made from an insulated material. As shown, the root jacket 74 has a hollow cylindrical shape with an outer diameter, D, that matches an outer diameter of the conductive portion 70 and of the pin 42 overall. A cap 76 encases the core 66 opposite the conductive portion 70 and is also made from an insulated material. The cap 76 also has a generally cylindrical shape with an outer diameter D such that, when the pin 42 is viewed, it forms a first portion 78 that is insulated, a second portion 80 that is conductive, and a third portion 82, which includes the tip 50, that is insulated, all having a generally uniform outer diameter, D, and together forming the pin 42. As shown in FIG. 5, the first portion 78 extends over a first distance L1 along the length L of the pin 42, the second portion extends over a second distance L2, and the third portion extends over a third distance L3.

Turning now to the cross section of the connector 34 shown in FIG. 6, it can be seen that the sockets 56 extend through the body 54 between opposed openings 58. The sleeve 60, and also the remaining portions of the sockets 56 have a uniform internal diameter D, which is selected to mate with the pins 42 such that an electrical connection can be made between the conductive portion 70 of each pin 42 with the corresponding sleeve 60 of the socket 56 into which the pin 42 is inserted. To maximize and area of electrical conduction, the sleeve 60 extends peripherally around the socket 56. In terms of lengths, each socket 56 has an overall length L' that is, at most, the length L, which is made up from a first length L1', which extends along the socket 56 on one side of the sleeve 60, a second length L2', which extends along the sleeve 60, and a third length L3', which extends on an opposite side of the sleeve 60. In the illustrated embodiment, the distance L2 is selected to be substantially equal or shorter than the second length L2', but it should be appreciated that the lengths L2 and L2' can be different or equal depending on a particular application. For the same reason, the first and third lengths L1' and L3' are selected to be smaller or, at most, substantially equal to the first distance L1 such that the conductive portion 70 overlaps the sleeve 60 when the pin 42 is inserted in the socket 56 from either opening 58, as shown in FIG. 8, but these lengths may also be different depending on application. The third distance L3 of the pin 42 may be longer than both the first and third lengths L1' and L3' as shown or, in general, the overall length of the pin L is equal or larger than the length of the socket L' such that the pin 42 may just reach or even extend past the open end 58 of the socket 56, by a distance, d=(L−L') as shown in FIG. 8.

The arrangement of placing the electrical connections between the sleeves 60 and the conductive portions 70 of the pins 42 deep into the sockets 56, a closer arrangement of pins 42 and corresponding sockets 56 on the connectors 34 and 38 can be achieved, even though high electrical voltage, e.g. 1.6 kV, and high currents, e.g. 500 Amp, are conducted. This is because the conductive portions are surrounded on all sides by insulated materials and not air. In one embodiment, for example, a distance between adjacent pins can be short, in the order of 10 mm, when the spacing in traditional connectors carrying the same electrical voltage must be at least 50 mm. The insulated lengths at the root and tip of the pins can be in the order of 20 mm, and the conductive lengths can be in the order of 30 mm. The pin diameter D can be in the order of 20 mm.

An additional advantage of this arrangement is that the connectors are self-cleaning, which is an important aspect when considering the operating environment for these connectors. Because debris, water, snow, ice, mud and other material may deposit and/or collect on the pins 42 or within the socket 56, insertion of the pin 42 in the socket 56 can operate to clean both interfaces by virtue of the insertion operation. As shown in FIG. 7, the tip 50 can sweep the inner diameter of the socket 56 as the pin 42 is inserted in the direction of the arrow shown. Debris 84 that is collected by the tip 50 is free to fall out of the open end at the opposite opening 58. Similarly, the inlet side opening 58 scrapes the outer diameter D of the pin 42 as it is inserted such that debris 84 falls away, especially of the connector 38 is constructed without a cavity 48 (FIG. 3) surrounding the pins 42. This cleaning process is advantageously repeated at each electrical connection between connectors 34 and 38.

An additional advantage of this arrangement is that the connectors are bi-directional, meaning, the pins may be inserted into their respective sockets from either end of the sockets. To accomplish this, the pins and sockets are arranged in a symmetrical way around a midpoint of the respective connector bodies such that the pins line up with corresponding sockets regardless of whether the pins are inserted from one axial end opening of the sockets or the other. Moreover, the electrical signals carried by the various pins are arranged in a symmetrical fashion on each connector, as is described below, to enable the connection of the pins with the sockets from one side of the connector block 54 or the other. This configuration is useful, for example, when a vehicle approaches the charging station either in the forward or reverse travel directions.

Figure 9:
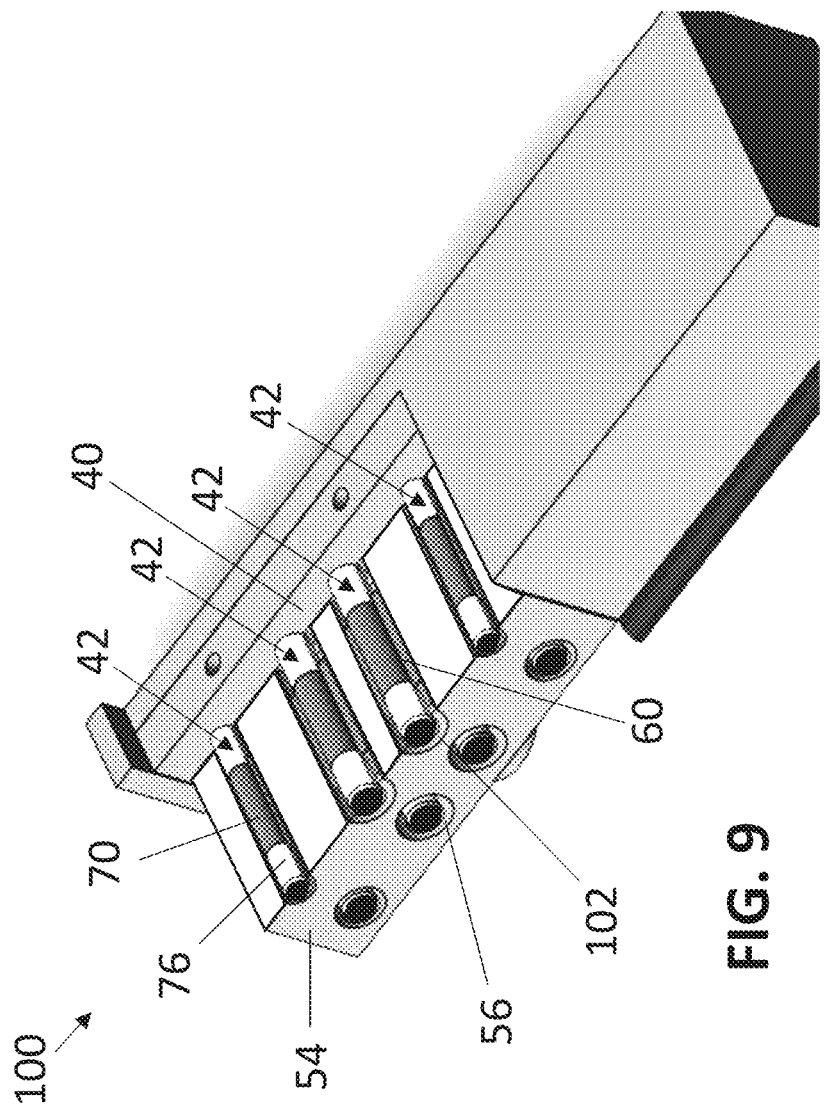
FIG. 9 is a partial section through a mated pair of connectors in accordance with the disclosure.
Figure 10:
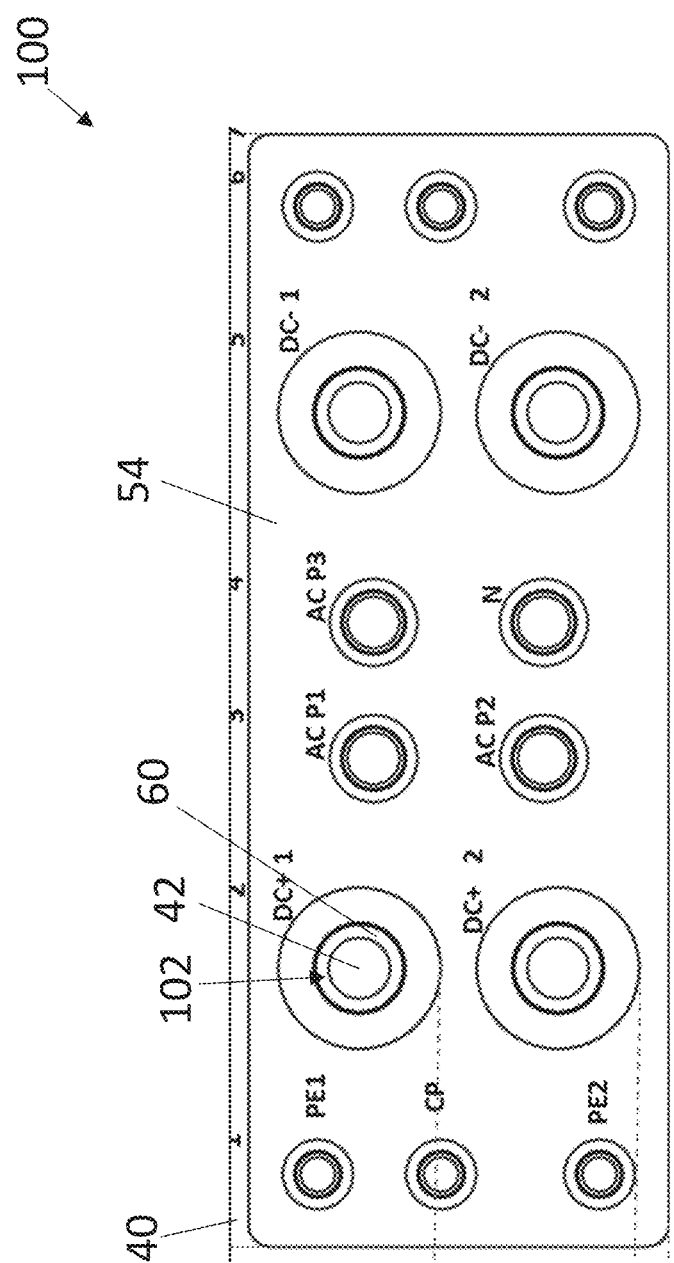
FIG. 10 is a schematic view of a connector pin arrangement in accordance with the disclosure.

An additional embodiment for a connector 100 is shown in FIGS. 9 and 10. In these illustrations, structures and features that are the same or similar to corresponding structures and features previously described are denoted by the same reference numerals previously used for simplicity. With reference to FIG. 9, it can be seen that the pins 42 extending from the connector block 40 pass through the sockets 56 where they contact the sleeves 60. In this embodiment, it can be seen that the inner diameter of the sockets 56 is larger than an outer diameter of the pins 42 such that a radial gap 102 remains around the pin 42 along segments of the socket 56 that are on either side of the sleeve 60. The sleeve 60, of course, contacts the conductive portion 70 of each respective pin 42 to establish an electrical connection, but remaining portions of the area around the pins 42 within the sockets 56 is left open to advantageously discourage collection of debris and to provide a space in which debris can collect during a cleaning process as the pin is inserted into the socket, as described above.

In the illustration of FIG. 10, a front view of the mated connectors is provided, where the gaps 102 can be seen extending radially around each pin 42. Different pin designations are also marked, where AC or DC denotes pins carrying alternating or direct voltage, protective ground or earth pins (PE), are arranged on the sides, and so on. It is noted that the sleeves 60 may further include resilient portions that elastically deform to conform to the outer surfaces of the pins and thus provide a better electrical connection.

Moreover, as mentioned above, the connector block and pins can be dimensioned and the layout of pins can be selected in a configuration that is appropriate for the expected charging applications. E.g. for AC only charging there is no need for DC pins. For DC charging, AC pins could be removed or alternatively, empty sockets without sleeves could be present in the connector block 54. For high power, high current applications, the pins and sleeves would be of a larger diameter or length, and for high voltage applications, the pin, sleeve separations and insulation distances and thicknesses could be made larger in order to ensure safe operation at high voltage levels. Notably, the arrangement of pins and sockets is selected to be symmetrical relative to a midpoint of the connector 100 such that insertion of the pins into their respective sockets can be carried out on either side of the connector block 54.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A connector arrangement for charging an electric vehicle, comprising:
   a first connector having a first connector body made from an electrically insulated material and including a first electrical conductor;
   a pin extending from the first connector body, the pin including a core made from an electrically conductive material, the core being electrically connected with the first electrical conductor;
   a second connector having a second connector body made from an electrically insulated material and including a second electrical conductor;
   a socket extending through the second connector body between two opposed openings; and
   a sleeve made from an electrically conductive material, the sleeve disposed along the socket and being electrically connected with the second electrical conductor, wherein the sleeve has an internal diameter that mates with an outer diameter of the pin, and wherein the socket has an internal diameter that is larger than the outer diameter of the pin such that a radial gap is defined between portions of the pin and portions of the socket,
   wherein an electrical connection between the first and second electrical conductors is established when the pin is fully disposed within the socket in a mated condition of the pin and the socket such that the core is electrically connected with the sleeve and a remaining portion of an area around the pin within the socket other than a mated portion between the pin and the sleeve is left open by a presence of the radial gap.

2. The connector arrangement of claim 1, wherein the core includes a root portion that extends from the first connector body, a conductive portion, and a tip portion.

3. The connector arrangement of claim 2, wherein the conductive portion is cylindrical shaped and extends peripherally around the pin.

4. The connector arrangement of claim 2, wherein the root portion is surrounded by a root jacket made from an insulated material, the root jacket having a hollow cylindrical shape with an outer diameter that matches an outer diameter of the conductive portion.

5. The connector arrangement of claim 2, wherein the tip portion is encased by a cap made from an insulated material, the cap having a generally cylindrical shape with an outer diameter that matches the outer diameter of the conductive portion.

6. The connector arrangement of claim 1, wherein the pin has a pin length that is at least equal to a socket length of the socket.

7. The connector arrangement of claim 1, wherein the remaining portion of the area around the pin within the socket left open in the mated condition of the pin and the socket by the presence of the radial gap facilitates discouraging collection of debris and providing a space in which debris can collect during a cleaning process as the pin is inserted into the socket.

8. The connector arrangement of claim 1, wherein the pin is insertable through either of two end socket openings to establish the electrical connection.

9. The connector arrangement of claim 8, further comprising a plurality of pins that are insertable in a plurality of sockets formed in a connector block to establish a plurality of electrical connections, and wherein the plurality of pins is insertable through either of two axial ends of the connector block.

10. A compact connector arrangement, comprising:
a first connector having a first connector body made from an electrically insulated material and including a first plurality of electrical conductors;
a plurality of pins extending from the first connector body, each of the plurality of pins including a core made from an electrically conductive material, the core being electrically connected with one of the first plurality of electrical conductors;
a second connector having a second connector body made from an electrically insulated material and including a second plurality of electrical conductors;
a plurality of sockets extending through the second connector body between two corresponding opposed openings; and
a plurality of sleeves made from an electrically conductive material, the plurality of sleeves disposed along a socket from the plurality of sockets and being electrically connected with one of the second plurality of electrical conductors,
wherein at least one pin of the plurality of pins has a cross-sectional area that is different from a cross-sectional area of at least one other pin of the plurality of pins, and
wherein an electrical connection between the first and second pluralities of electrical conductors is established when the plurality of pins is fully disposed within the plurality of sockets such that each respective core is electrically connected with each respective sleeve.

11. The compact connector arrangement of claim 10, wherein each core includes a root portion that extends from the first connector body, a conductive portion, and a tip portion.

12. The compact connector arrangement of claim 11, wherein the conductive portion of each core is cylindrical in shape and extends peripherally around the respective pin.

13. The compact connector arrangement of claim 11, wherein each root portion is surrounded by a respective root jacket made from an insulated material, each root jacket having a hollow cylindrical shape with an outer diameter that matches an outer diameter of the conductive portion of the respective pin.

14. The compact connector arrangement of claim 11, wherein each tip portion is encased by a respective cap made from an insulated material, each cap having a generally cylindrical shape with an outer diameter that matches the outer diameter of the conductive portion of the respective pin.

15. The compact connector arrangement of claim 10, wherein the plurality of pins has a pin length that is at least equal or longer than a socket length of the plurality of sockets.

16. The compact connector arrangement of claim 14, wherein each sleeve has an internal diameter that mates with an outer diameter of the respective pin so that an electrical connection is made between each conductive portion and each sleeve, and wherein each socket has an internal diameter that is larger than the outer diameter of the respective pin such that a radial gap is defined between portions of each pin and portions of each socket.

17. The compact connector arrangement of claim 10, wherein the plurality of pins is insertable from either side of the second connector body through either of the two corresponding opposed openings.

18. The compact connector arrangement of claim 17, wherein the first and second pluralities of electrical conductors are arranged in a symmetrical fashion to permit a bidirectional connection between the first and second connectors.

19. A method for providing a self-cleaning electrical connector, comprising:
providing a pin extending from a first connector body, the first connector body including a first electrical conductor, the pin including a core made from an electrically conductive material, the core electrically connected with the first electrical conductor;
providing a socket formed in a second connector body, the second connector body including a second electrical conductor, the socket being open between two opposed openings in the second connector body to form a through-bore;
providing a sleeve made from an electrically conductive material, the sleeve disposed along the socket and electrically connected to the second electrical connector, wherein the sleeve has an internal diameter that mates with an outer diameter of the pin, and wherein the socket has an internal diameter that is larger than the outer diameter of the pin;
inserting an insulated tip of the pin into the socket through the first of the two opposed openings;
providing a radial gap defined between portions of the outer diameter of the pin and portions of the socket;
removing debris from the socket by scraping an inner surface of the socket with the insulated tip while pushing the tip towards the second of the two opposed openings; and
establishing an electrical connection between the first and second electrical conductors with the pin fully disposed within the socket in a mated condition of the pin and the socket such that the core is electrically connected with the sleeve and a remaining portion of an area around the pin within the socket other than a mated portion between the pin and the sleeve is left open by a presence of the radial gap.

20. The method of claim 19, wherein the radial gap is configured to collect debris and allow removal of the debris from the socket, the method further comprising:
discouraging collection of debris; and
providing a space in which debris can collect during a cleaning process as the pin is inserted into the socket,
wherein the remaining portion of the area around the pin within the socket left open in the mated condition of the pin and the socket by the presence of the radial gap facilitates the steps of: discouraging collection of debris, and providing a space.

* * * * *